US012744999B2

(12) United States Patent
Hellerud et al.

(10) Patent No.: US 12,744,999 B2
(45) Date of Patent: Sep. 22, 2026

(54) ECHO-BASED FOCUS

(71) Applicant: Cisco Technology, Inc., San Jose, CA (US)

(72) Inventors: Erik Hellerud, Oslo (NO); Asbjorn Therkelsen, Nesbru (NO)

(73) Assignee: Cisco Technology, Inc., San Jose, CA (US)

( * ) Notice: Subject to any disclaimer, the term of this patent is extended or adjusted under 35 U.S.C. 154(b) by 133 days.

(21) Appl. No.: 18/100,278

(22) Filed: Jan. 23, 2023

(65) Prior Publication Data

US 2024/0251163 A1 Jul. 25, 2024

(51) Int. Cl.
*H04N 23/67* (2023.01)
*G01S 15/08* (2006.01)

(52) U.S. Cl.
CPC ............ *H04N 23/671* (2023.01); *G01S 15/08* (2013.01)

(58) Field of Classification Search
CPC .......... H04N 23/671; G01S 15/08; G02B 7/40
See application file for complete search history.

(56) References Cited

U.S. PATENT DOCUMENTS

| | | | |
|---|---|---|---|
| 8,248,448 B2 | 8/2012 | Feng et al. | |
| 8,754,925 B2 | 6/2014 | Ng et al. | |
| 9,529,428 B1 * | 12/2016 | Bhattacharya | G06F 3/012 |
| 9,638,984 B2 | 5/2017 | Lou et al. | |
| 10,992,905 B1 | 4/2021 | Therkelsen et al. | |
| 11,481,917 B2 | 10/2022 | Ossig et al. | |
| 11,854,564 B1 * | 12/2023 | Chatlani | G10L 15/16 |
| 2010/0118112 A1 * | 5/2010 | Nimri | H04N 7/142 348/E7.083 |
| 2015/0146078 A1 | 5/2015 | Aarrestad et al. | |
| 2015/0281553 A1 * | 10/2015 | Ogura | G02B 7/09 348/348 |
| 2016/0327643 A1 * | 11/2016 | Schwager | G03B 13/20 |
| 2017/0003573 A1 * | 1/2017 | Dayana | G03B 13/36 |
| 2017/0013354 A1 * | 1/2017 | Yang | H04R 3/005 |
| 2017/0094222 A1 * | 3/2017 | Tangeland | H04N 23/51 |
| 2020/0267304 A1 * | 8/2020 | Park | H04N 23/76 |
| 2021/0185221 A1 * | 6/2021 | Shimauchi | H04N 23/611 |
| 2021/0200991 A1 * | 7/2021 | Prins | G06V 40/19 |

(Continued)

OTHER PUBLICATIONS

Lieu, Ryan, "Ultrasonic Autofocus", online: https://devpost.com/software/ultrasonic-autofocus, accessed Jan. 17, 2023, 5 pages, Devpost, Inc.

(Continued)

*Primary Examiner* — Twyler L Haskins
*Assistant Examiner* — John H Morehead, III
(74) *Attorney, Agent, or Firm* — Lee & Hayes, P.C.

(57) ABSTRACT

According to one or more embodiments of the disclosure, a device may make, based on an echo reflected from a subject of an image capture, a determination that a distance between a camera and the subject of the image capture has stabilized following a change in the distance. The device may determine whether to initiate a refocus of the camera on the subject based on the distance between the camera and the subject of the image capture following the change. The device may identify a focal search range of the refocus based on the distance between the camera and the subject of the image capture following the change. The device may cause the refocus on the subject using the focal search range.

20 Claims, 8 Drawing Sheets

(56) References Cited

U.S. PATENT DOCUMENTS

| | | | | |
|---|---|---|---|---|
| 2022/0014681 A1* | 1/2022 | Waitz | ..................... | H04N 23/60 |
| 2022/0116545 A1* | 4/2022 | Feng | ...................... | G03B 13/30 |
| 2022/0358678 A1* | 11/2022 | Ossig | ...................... | G06T 7/521 |
| 2022/0417420 A1* | 12/2022 | Ko | ......................... | H04N 23/56 |

OTHER PUBLICATIONS

Haparnas, Ziv, "How does a Digital Camera Active Auto Focus Work", online: https://www.picturecorrect.com/active-auto-focus-digital-photography/, accessed Jan. 17, 2023, 3 pages, PictureCorrect, Inc.

Vorenkamp, Todd, "How Focus Works", online: https://www.bhphotovideo.com/explora/photography/tips-and-solutions/how-focus-works, accessed Jan. 17, 2023, 17 pages, B & H Foto & Electronics Corp.

"#StrongerTogether", online: https://www.poly.com/us/en, accessed Jan. 17, 2023, 3 pages, Plantronics, Inc.

"Polaroid's amazing sonar autofocus [Instant Breakdown]", online: https://www.youtube.com/watch?v=llkiNakd9nc, accessed Jan. 17, 2023, 11 pages.

"Polaroid SX-70 (Sonar Onestep) Commercial", online: https://www.youtube.com/watch?v=35y8BRIh-fQ, accessed Jan. 17, 2023, 6 pages.

"The applications of Chirp Microsystems' ultrasonic range finder @ CES 2021", online: https://techpodcasts.com/2021/02/26/the-applications-of-chirp-microsystems-ultrasonic-range-finder-ces-2021/, accessed Jan. 17, 2023, 3 pages.

* cited by examiner

ECHO-BASED FOCUS

TECHNICAL FIELD

The present disclosure relates generally to echo-based focus.

BACKGROUND

Widespread adoption and use of video conferencing has reshaped work and the modern workplace. For instance, it is now common for enterprises to have a geographically dispersed (e.g., dispersed locally, nationally, internationally, etc.) collaborative workforce. This workforce may collaborate with each other from their geographically dispersed campuses using video conferencing technology.

Video conferencing allows geographically dispersed groups of people to virtually engage in live meetings without needing to be in the same physical location. Instead, participants can virtually attend the meeting online from any capable device. Today's video conferencing applications allow participants to view each other in substantially real-time, much like an in-person meeting.

Since a participant interacts with other participants and materials through the video conferencing equipment (e.g., camera, display, speaker, microphone, etc.), the performance of that equipment is important. One example of how video conferencing equipment performance effects video conferencing is in the operation of a camera being used to capture images of a participant for the video conference. Particularly, the ability of the camera to consistently capture focused images of a participant during a video conference is essential to delivering high-quality images to other participants and providing a superior user experience.

Many cameras utilize auto focusing mechanisms to achieve and/or maintain focus when capturing images. Unfortunately, current auto focusing mechanisms produce nearly constant undirected focusing operations. These operations produce visually evident focusing artefacts in image captures that are often irritating, distracting, and/or disorienting for video conference participants who are receiving the images.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
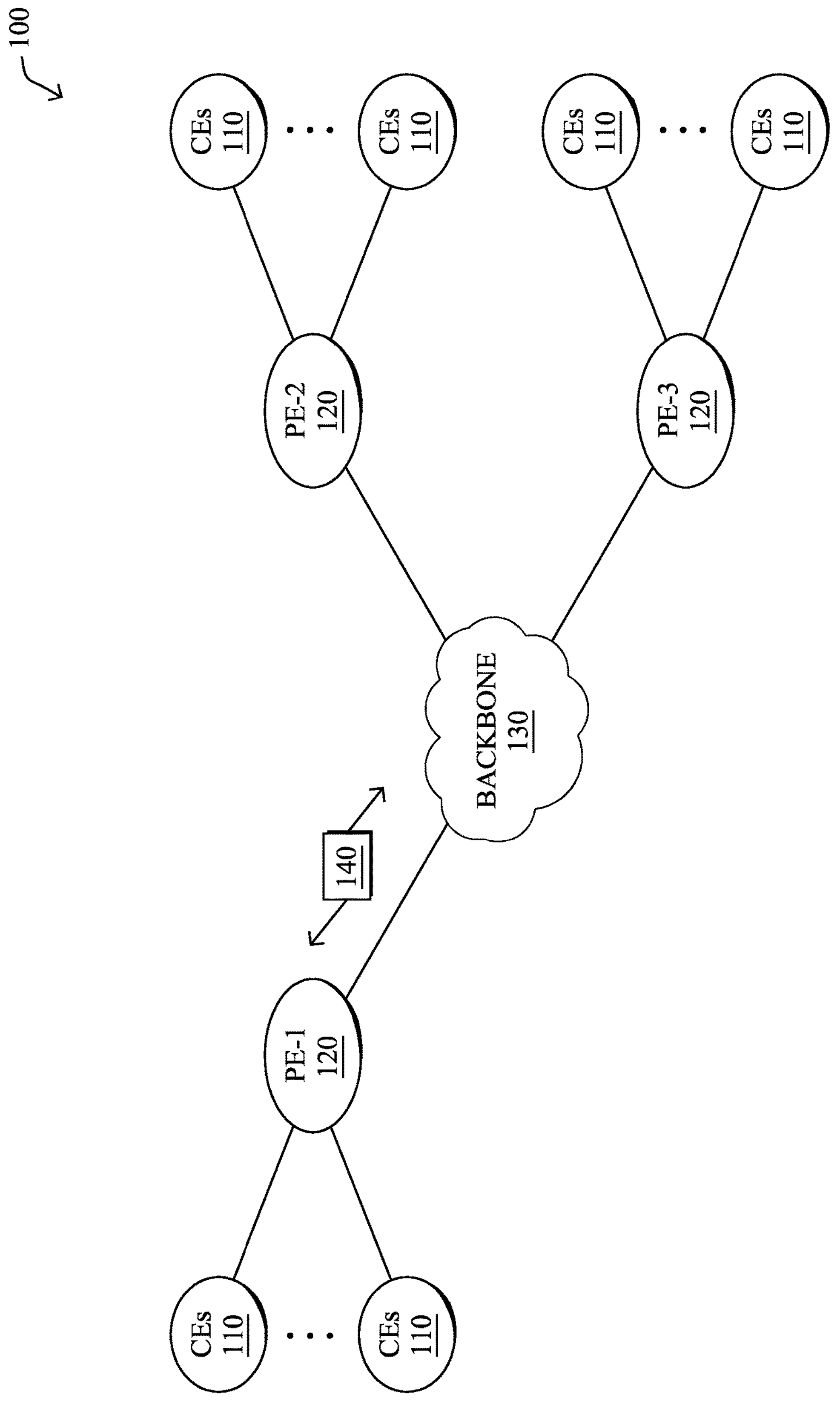
FIGS. 1A-1B illustrate an example communication network.

According to one or more embodiments of the disclosure a device may make, based on an echo reflected from a subject of an image capture, a determination that a distance between a camera and the subject of the image capture has stabilized following a change in the distance. The device may determine whether to initiate a refocus of the camera on the subject based on the distance between the camera and the subject of the image capture following the change. The device may identify a focal search range of the refocus based on the distance between the camera and the subject of the image capture following the change. The device may cause the refocus on the subject using the focal search range.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc, may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
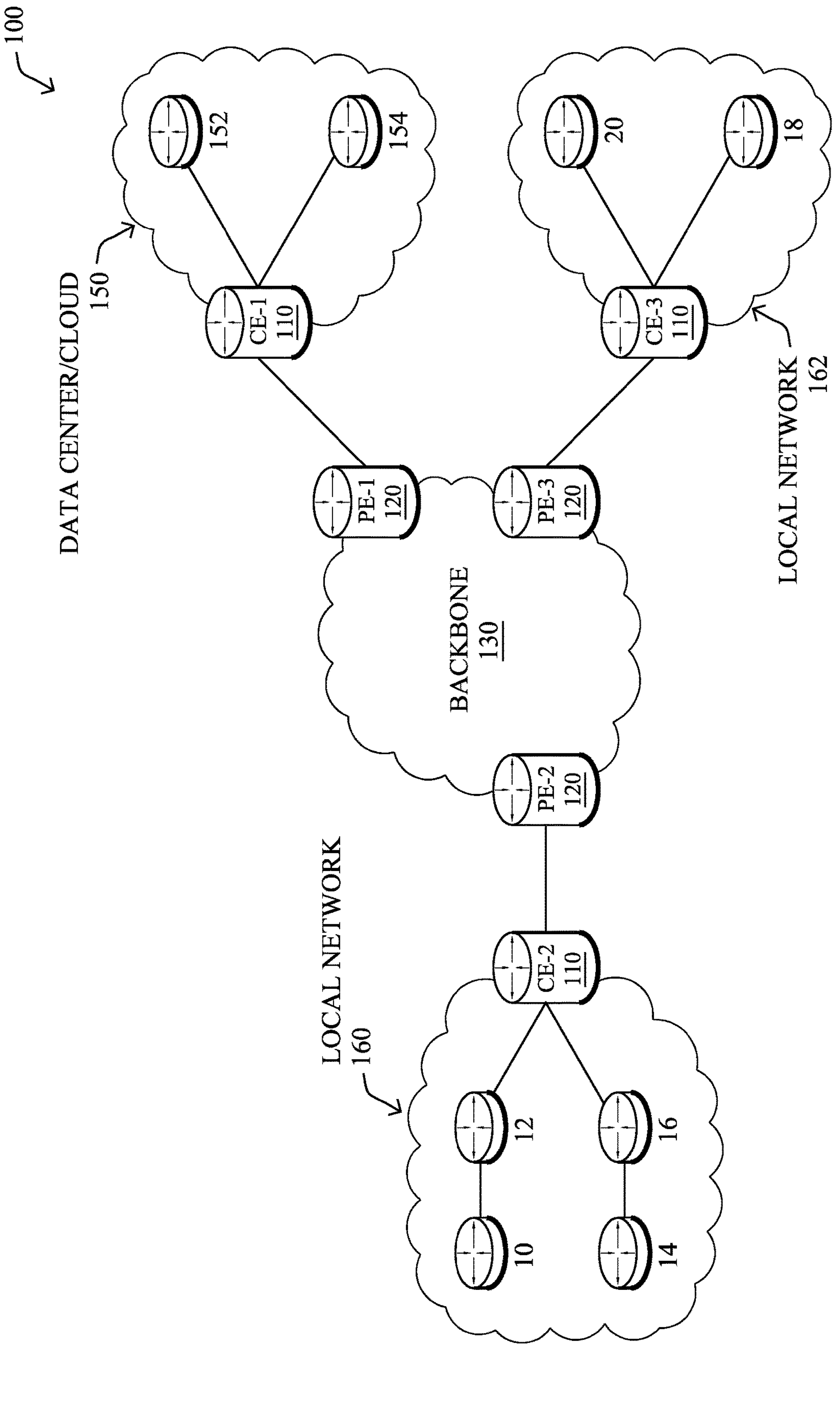

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
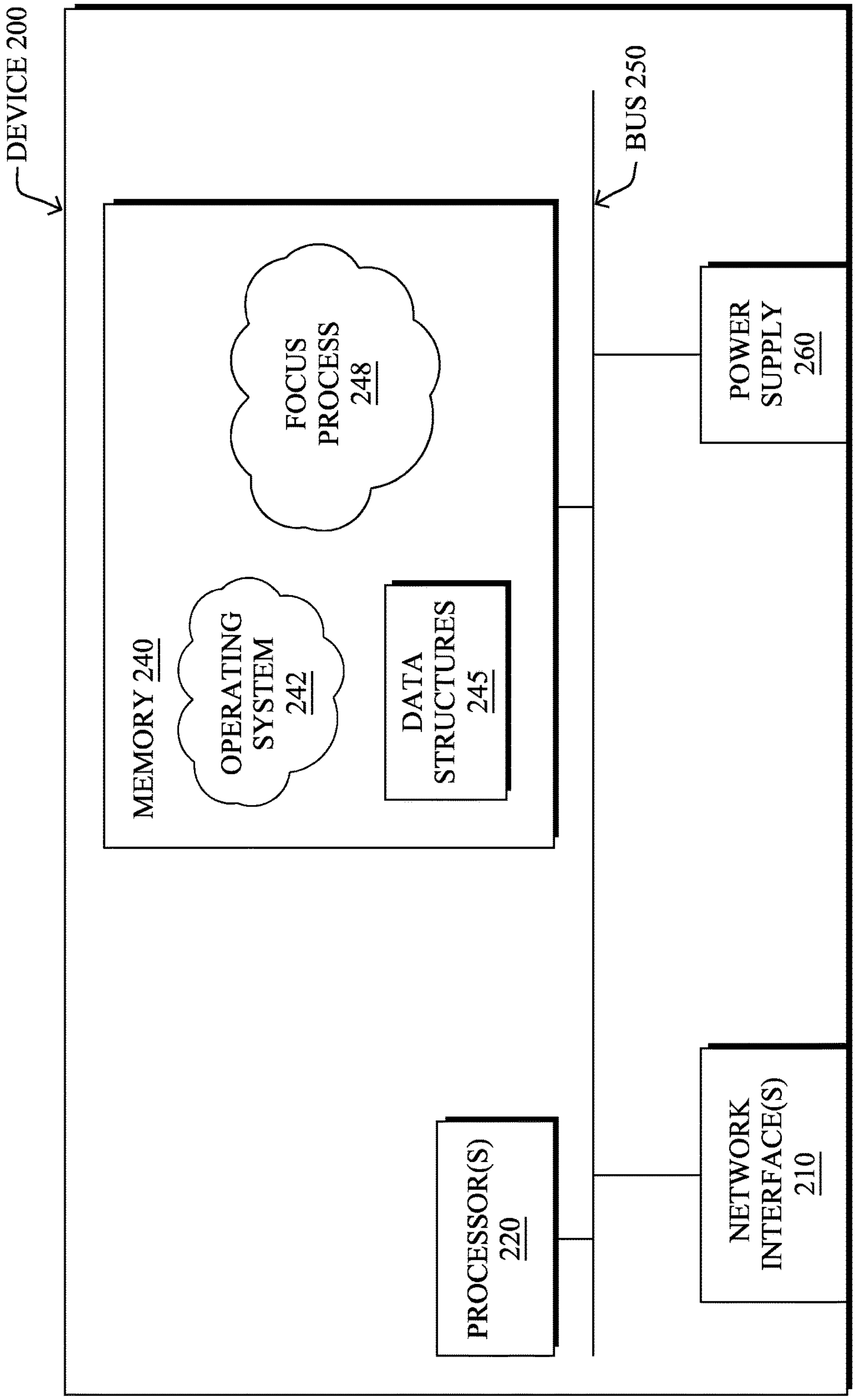
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise focus process 248, as described herein, any of which may alternatively be located within individual network interfaces.

Figure 3:
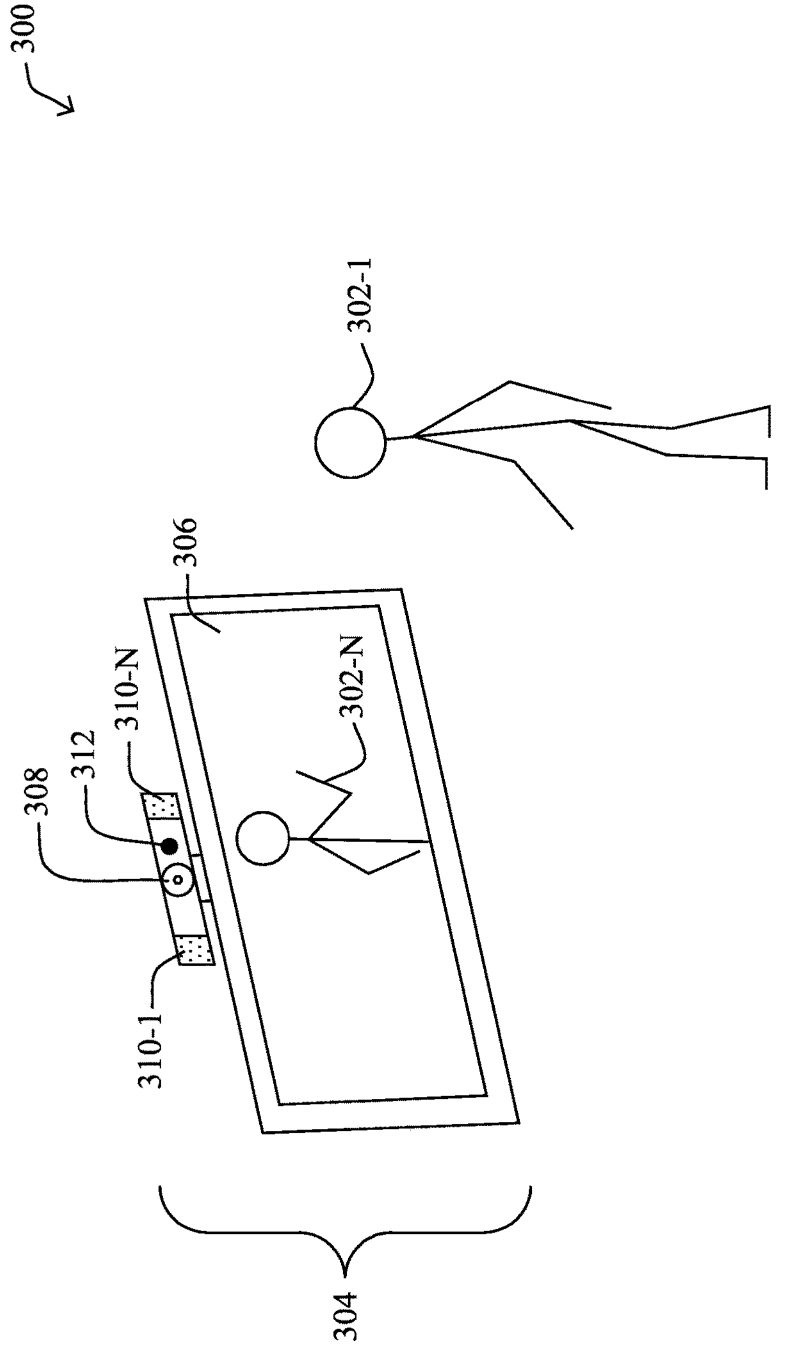
FIG. 3 illustrates an example deployment for video conferencing.

FIG. 3 illustrates an example of a deployment 300 of video conferencing equipment 304. For example, deployment 300 illustrates an example of video conferencing equipment 304 (e.g., a video conferencing endpoint) being used to conduct a video conferencing session between users 302 (e.g., user 302-1 . . . 302-N). The users 302 may be geographically dispersed and/or utilize a video conferencing application to communication video conferencing session data among each other across a data network.

Video conferencing equipment 304 may include display 306. Display 306 may include a monitor or other image reproducing device upon which images of the video conferencing session are displayed. In some instances, display 306 may include a headset, a holograph generator, or other extended reality display. Users 302 may view images, such as video feeds, of the video conferencing session on a display 306. The appearance of the images on display 306 may be influenced by the performance of the video conferencing components (e.g., such as the capturing device 308) capturing those images on the other end of the session.

Further, video conferencing equipment 304 may include one or more audio generating devices 310 (e.g., audio generating device 310 . . . 310-N). Audio generating devices 310 may include speakers that convert electromagnetic waves into audio waves which can be propagated to the subject. Audio generating devices 310 may use these audio waves to provide users 302 with audio, such as an audio feed, from the video conferencing session.

Furthermore, video conferencing equipment 304 may include one or more audio capturing devices, such as audio capturing device 312. Audio capturing device 312 may include a microphone to capture audio from the environment of the user 302. Audio capturing device 312 may capture audio from a user for communication, such as part of an audio feed, to other users during a video conferencing session.

Additionally, video conferencing equipment 304 may include one or more image capturing devices such as image capturing device 308. The image capturing device 308 may include a camera positioned to capture images of a subject (e.g., a user 302-1, an object, an environment, etc.). The image capturing device 308 may capture images of users 302 for communication, such as part of a video feed, to other users during a video conferencing session.

The image capturing device 308 may include components such as one or more lenses, light sensors, mirrors, focusing components such as focus motors and deflectors, etc. The image capturing device 308 may adjust one or more of these components to achieve a focus (e.g., a maximum resolution, sharpness, contrast, etc.) of a subject of which it is capturing images. Image capturing device 308 may use an auto focus mechanism which automatically and/or computationally, rather than manually, maintains focus on a subject.

As noted above, current auto focus mechanisms produce constant focus movements that are visible and generally very disturbing for an end user. For example, conventional camera auto focus mechanisms rely on persistent contrast-based search to find a focus point for a scene being captured by the camera. These mechanisms may rely on analysis of the contrast of pixels on the camera's sensor as it continuously manipulates the lens and/or other focusing mechanism of the camera back and forth until it finds the right focusing point. Therefore, these mechanisms constantly move focus in order to verify that a current scene is in focus. The resulting persistent visible focus fluctuations may irritate users and reduce adoption of video conferencing equipment and services.

Echo-Based Focus

The techniques herein introduce mechanisms to reduce the frequency and duration of auto focusing operations to minimize and/or eliminate irritating autofocusing artefacts. The techniques provide an audio ping-assisted focusing mechanism which provides robust and rapid focusing without introducing additional video conferencing equipment. The audio ping-assisted focusing mechanism may be used to estimate a distance to a user in front of an endpoint (e.g., video conferencing camera) in a manner that enables better decisions about when and in which direction an auto focusing operation should be undertaken.

Illustratively, the techniques described herein may be performed by hardware, software, and/or firmware, such as in accordance with focus process 248, which may include computer executable instructions executed by the processor 220 (or independent processor of interfaces 210) to perform functions relating to the techniques described herein.

Specifically, according to various embodiments, a device may make, based on an echo reflected from a subject of an image capture, a determination that a distance between a camera and the subject of the image capture has stabilized following a change in the distance. The device may determine whether to initiate a refocus of the camera on the subject based on the distance between the camera and the subject of the image capture following the change. The device may identify a focal search range of the refocus based on the distance between the camera and the subject of the image capture following the change. The device may cause the refocus on the subject using the focal search range.

Figure 4:
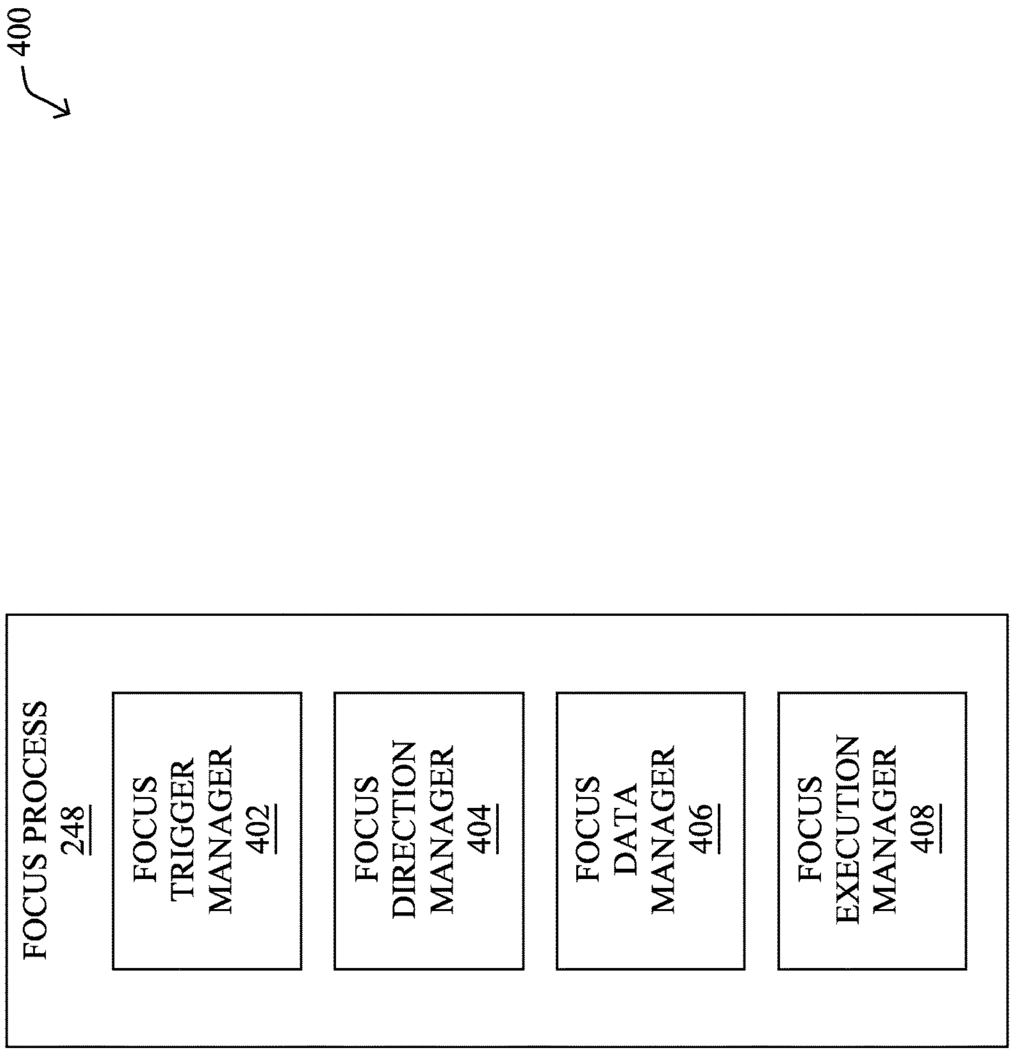
FIG. 4 illustrates an example architecture for echo-based focusing.

Operationally, FIG. 4 illustrates an example of an architecture 400 for echo-based focusing according to various embodiments. At the core of the architecture 400 is focus process 248, which may be executed by a device that provides a video conferencing service in a network, or another device in communication therewith. In general, the focus process 248 may be executed to configure a video conferencing experience and/or video conferencing equipment during a video conferencing session and, therefore, may be executed on any device associated with the delivery of the video conferencing session. For example, focus process 248 may be executed to control the focusing operations of an image capturing device, the audio capturing operations of an audio capture device, and/or audio emissions of an audio generating device to facilitate a video conferencing session.

In various embodiments, video conferencing may be conducted via a video conferencing endpoint. A video conferencing endpoint may include a system which combines video conferencing equipment (e.g., cameras, displays, microphones, speakers, etc.) into a single platform. In some examples, focus process 248 may be executed at the video conferencing platform and/or at a device in communication therewith.

As shown, focus process 248 may include a focus trigger manager 402, a focus direction manager 404, a focus data manager 406, and/or focus execution manager 408. As would be appreciated, the functionalities of these components may be combined or omitted, as desired. In addition, these components may be implemented on a singular device or in a distributed manner, in which case the combination of executing device can be viewed as their own singular device for purposes of executing focus process 248.

Focus process 248 may utilize a distance-identifier to perform its operations. Specifically, focus process 248 may utilize an identification of the distance between video conferencing equipment and a video conferencing subject in the performance of its operations. For instance, focus process 248 may utilize a distance between the subject and a camera capturing images of that subject for a video conferencing session (e.g., as a video feed) to steer its operations.

In various embodiments, this distance may be determined from an audio ping. For example, a robust estimate of the distance from a camera to a subject in front of a video endpoint may be made by measuring the delay between the moment of emitting an audio signal from a speaker and the moment of receiving an echo of that signal reflected back from the subject to a microphone associated with the speaker and/or camera. The audio ping may be an ultrasonic audio signal emission from a speaker in up to a 24 kHz range. The audio ping may be emitted using existing speakers and/or internal microphones in a video conferencing endpoint device which are also used for the capture and/or provision of images and/or audio of the video conferencing session itself.

In some examples, one or more operations of focus process 248 may be executed at a same device as and/or at a different device from the device where the audio ping echo is received and/or processed. In some examples, one or more operations of focus process 248 may be executed at a same device as and/or at a different device from the device where the audio ping echo delay is translated to a distance between the camera and the subject.

During execution, focus trigger manager 402 may determine when to trigger a refocus operation based on the subject-to-video conferencing endpoint distance estimation. As used herein, the subject-to-video conferencing endpoint distance may be understood as a distance between the subject and the video conferencing endpoint platform generally, the distance between the subject and a video conferencing sub-component of the video conferencing endpoint platform such as a camera, and/or the distance between the subject and a camera)

For example, given a successful initial auto focus search producing an image capture by a camera of a scene where the subject is in focus, focus trigger manager 402 may utilize changes in the subject-to-video conferencing endpoint distance to detect whether the subject may be out of focus and/or whether to trigger a refocusing operation (e.g., adjusting the focus, focal plane, depth of field, shutter speed, aperture, lens position, etc. of the camera to achieve an improved focus on and/or image capture of the subject) to correct the focus.

For example, focus trigger manager 402 may detect, based on the audio ping echo delay, when the distance from the camera to a subject is changing. This may be a result of the subject moving their position relative to the camera resulting in a relative distance change. For example, the distance may decrease as the subject leans toward a camera but may increase as the subject leans away from the camera. Detecting the changing distance may serve as an indication that the subject is moving and/or that a refocus operation may be needed after the movement has stopped.

While the distance between the camera and the subject is changing, refocusing operations may be delayed. In various embodiments, refocusing by the camera may be delayed until the distance change has stabilized. The change may be considered to be stabilized when the distance between the subject has stopped changing, the subject is no longer moving, the subject's movement and/or distance from the camera has stabilized within threshold amounts of movement and/or distance change, etc.

In some embodiments, refocusing by the camera may be delayed until the change in the subject's distance from the camera has stabilized unless a threshold amount of time has elapsed since a last focusing operation and/or a last stabilization of the distance change. If these thresholds are exceeded, then the refocusing operation may be initiated immediately. This may prevent instances of an image capture remaining out of focus for too long or allowing the subject to move too far away before beginning the refocusing operation. Likewise, refocusing by the camera may be delayed until the change in the subject's distance from the camera has stabilized unless the changed in the subject's distance from the camera has exceed a threshold amount of change before stabilizing (e.g., the subject has moved too far out of focus to delay refocusing operations).

Focus trigger manager 402 may determine that a distance between a camera and the subject of the image capture has stabilized following a change in the distance. For example, the audio ping echo delay may be utilized to detect movements of a subject in front of a video endpoint and/or to estimate the distance from the video endpoint to the moving subject. When the subject has stopped moving and/or their distance from the video endpoint has stopped changing, an audio ping echo delay may detect this stabilization and determine an updated distance (e.g., one or more distance measurements or estimate, a range of distance measurements or estimates, an average of one or more distance measurements or estimates, etc.) between the subject and the video endpoint.

Focus trigger manager 402 may determine whether a refocusing operation should be initiated following the stabilization based on the updated distance between the subject and the video endpoint. For example, focus trigger manager 402 may determine that a refocusing operation should be triggered when the stabilized updated distance between the subject and the video endpoint is outside a range of distance values corresponding to the current focus settings of the camera. That is, if the updated subject-to-video conferencing endpoint distance is outside of a range of distances that lie within an acceptable area of focus for the current focus settings of the camera, then focus trigger manager 402 may trigger a refocusing operation. Conversely, focus trigger manager 402 may determine that a refocusing operation should not be triggered when the updated distance between the subject and the video endpoint once stabilized is within a range of distance values corresponding to the current focus settings of the camera.

In some instances, focus trigger manager 402 may make a more binary determination of whether a refocusing operation should be triggered. Namely, focus trigger manager 402 may initiate a refocusing operation when the stabilized updated distance between the subject and the video endpoint corresponds to a distance value that is at all different from the subject-to-video conferencing endpoint distance associated with the current focus settings of the camera. Conversely, focus trigger manager 402 may determine that a refocusing operation should not be triggered when the updated distance between the subject and the video endpoint once stabilized does not correspond to a distance value associated with focus settings of the camera that are different from the current focus settings of the camera and/or corresponds to a distance value associated with the current focus settings of the camera.

In some examples, focus trigger manager 402 may determine that a refocusing operation should be triggered when the change in subject-to-video endpoint distance measurement from an immediately prior successful focusing operation to the updated subject-to-video endpoint distance measurement at stabilization exceeds a threshold amount of change in distance. That is, focus trigger manager 402 may initiate a refocusing operation when the change in an initial subject-to-video endpoint distance from an initial focus position of the camera to the updated subject-to-video endpoint distance exceeds a threshold amount of distance change able to be accommodated while maintaining an acceptable focus on the subject using the initial focus position. In contrast, focus trigger manager 402 may determine that a refocusing operation should not be triggered when the change in subject-to-video endpoint distance measurement from an immediately prior successful focusing operation to the updated subject-to-video endpoint distance measurement at stabilization does not exceed a threshold amount of change in distance.

Therefore, during execution, focus trigger manager 402 may minimize the amount of auto focus searches. Since these searches may generate disturbing visual artefacts (e.g., the visual shifting of the focal plane back and forth producing images with a shifting focus), minimizing them may have the effect of minimizing visual disturbances, irritation, distraction, etc. to an end user receiving the images.

For example, focus trigger manager 402 may reduce refocusing operations by delaying them until a subject has stopped moving in a manner that is rapidly changing their distance from the video endpoint. Therefore, refocusing operations may be conducted less frequently and limited to moments when they are most likely to produce a successful and durable focus on a subject. In addition to delaying refocusing operations while a subject is moving, focus trigger manager 402 further reduces refocusing operations by only triggering them when they are warranted by a sufficient change in distance to the video endpoint after the movement has concluded (e.g., subject-to-video conferencing endpoint distance has stabilized). Accordingly, focus trigger manager 402 may minimize the frequency and/or duration of auto focus searches, thereby minimizing the visual disturbances to the far end participant receiving the resulting images. Overall, this may produce a more stable image appearance to the far end user and avoid persistent and/or fruitless auto focus searches.

During execution, focus direction manager 404 may determine a direction for a new focus search triggered by focus trigger manager 402. Focus direction manager 404 may determine a direction (e.g., move focus to near, move focus to far, etc.) of the new focus search based on the audio ping echo reflected from the subject of the image capture.

For example, focus direction manager 404 may use the audio ping echo delay distance estimate to determine a direction of a change in the distance between a camera and the subject of the image capture following an initial auto focus search producing an initial image capture of a subject at an initial distance from the video endpoint. Focus direction manager 404 may determine the direction of change based on whether the subject's distance from the video endpoint is increasing or decreasing relative to their initial distance and/or prior distances during the change. Focus direction manager 404 may determine the direction of change based on whether the subject's distance from the video endpoint increased or decreased relative to the initial distance once the change has stabilized. This may also be determined based on a slope value of a trend line among successive subject-to-video conferencing endpoint distance measurements.

Having determined a direction of change of distance between the video endpoint and the subject during a change, focus direction manager 404 may identify a corresponding direction in which a refocusing operation should proceed. For example, if a focus direction manager 404 determines that a direction of change of distance is away for further from the video endpoint, then focus direction manager 404 may determine that a refocusing operation should be configured to begin a focus search at a point that is no closer to the video endpoint that an initial or prior focus point and which proceeds to search potential focal planes in a direction that recedes from the video endpoint relative to the focal plane of the initial or prior focus point. That is, focus direction manager 404 may configure a refocusing operation so that a focal planes between a prior focal plane and infinity should be searched by the camera, focal planes should be searched by the camera with a search that proceeds out toward infinity further from the camera, etc.

Conversely, if a focus direction manager 404 determines that a direction of change of distance is toward or closer to the video endpoint, then focus direction manager 404 may determine that a refocusing operation should be configured to begin a focus search at a point that is no further from the video endpoint than an initial or prior focus point and which proceeds to search potential focal planes in a direction that approaches the video endpoint relative to the focal plane of the initial or prior focus point. That is, focus direction manager 404 may configure a refocusing operation so that focal planes between a prior focal plane and a hyperfocal distance or nearer to the camera should be searched by the camera, focal planes should be searched with a search that proceeds inward toward the hyperfocal distance or nearer to the camera, etc.

Therefore, in contrast to a traditional auto focus search, which randomly selects a direction to search and requires collection and analysis of multiple contrast samples before it is possible to detect that the refocus operation is proceeding in a wrong direction (e.g., a direction opposite the direction that the subject moved, a direction causing the focus to degrade further, etc.), focus direction manager 404 may utilize the audio ping echo distance measurement to identify which direction the refocusing operation should proceed along and configure it accordingly. Using this measurement to ascertain the correct starting direction of a search, focus direction manager 404 can avoid the camera moving further out of focus before turning around and focusing toward the correct direction during a refocusing operation. As a result, the duration of a focus search will be decreased by avoiding altogether the time spent focusing toward the wrong direction in non-directed focus searches.

In some examples, such as those involving a camera with a calibrated focus, focus direction manager 404 may be able to identify and directly move focus to a particular optimal focus position. For example, focus direction manager 404 may reference a data storage structure (e.g., built and/or maintained by focus data manager 406), which serves as a mapping of distances from the video endpoint to the subject and the camera's focus position corresponding to each of those distances, to identify a target focus position for a refocusing operations. For example, focus direction manager 404 may reference the mapping to identify a stored optimal focus position for a particular subject-to-video conferencing endpoint distance measurement and use that stored optimal focus position for any subsequent matching subject-to-video conferencing endpoint distance measurements.

Once focus direction manager 404 has identified a target optimal focus position, it may direct the refocusing operation to proceed directly to that optimal focus position and/or focus positions proximate to that optimal focus position to achieve a focus and/or to begin a focus search. Accordingly, this operation reduces the duration of the refocus operation by not only by configuring a search direction of the refocus operation to avoid the time spent focusing in the wrong direction but also by providing an exact optimal focus position and/or focal search range around an optimal focus position that further excludes the amount of focus positions to be searched during the refocusing operation.

During execution, focus data manager 406 may manage data regarding subject-to-video conferencing endpoint distances and/or their corresponding optimal focus positions (e.g., the focus position resolved for the camera during previous focusing operations on subjects at that subject-to-video conferencing endpoint distance). For example, the first time that a particular subject-to-video conferencing endpoint distance is detected by the audio ping echo delay method, focus data manager 406 may store that distance and the focus position resolved for that distance by a focus search.

Subsequently, when that same or a similar subject-to-video conferencing endpoint distance is detected by the audio ping echo delay method for a subsequent image capture, focus direction manager 404 may reference the entry for that distance and identify the stored focus position. Then focus direction manager 404 may configure the refocusing operation to proceed to that stored focus position and/or proximate focus positions to achieve a focus on the subject and/or initiate a focus search. Focus execution manager 408 may then cause the refocusing operation to be executed according to that configuration, resulting in the camera adjusting its focus to the stored focus position.

A verification focus search may be performed once the camera has adjusted its focus to the stored focus position. The verification focus search may verify that the subject is in focus and/or that the stored focus position represents an optimal focus position for the subject-to-video conferencing endpoint distance in that image capture.

In some instances, the verification search may yield a determination that the stored focus position was not the optimal focus position and/or that a better focus position was found for the subject-to-video endpoint distance in that image capture. In such instances, focus data manager 406 may update the subject-to-video conferencing endpoint distance and/or its corresponding stored focus position in the database so that the subject-to-video conferencing endpoint distance corresponds to the better focus position determined through the verification search.

During execution, focus execution manager 408 may cause a refocusing operation to occur as configured by the determinations of focus trigger manager 402 and/or focus direction manager 404. For example, focus execution manager 408 may cause a camera to initiate a focus search to refocus on a subject in response to focus trigger manager 402 triggering the refocusing operation. For instance, in response to receiving an indication from focus trigger manager 402 that the subject-to-video endpoint distance has stabilized following a change and/or that a most recent subject-to-video endpoint distance necessitates a refocusing operation, focus execution manager 408 may cause the refocus operation to occur at the camera.

Likewise, focus execution manager 408 may cause the refocus operation to proceed according to a configuration specified by focus direction manager 404. For instance, in response to focus direction manager 404 specifying a direction that the focus search should proceed and/or a search range or particular stored optimal value for the refocus operation, the focus execution manager may cause the camera to perform the focus search to proceed according to the specifications provided by focus direction manager 404.

Figure 5:
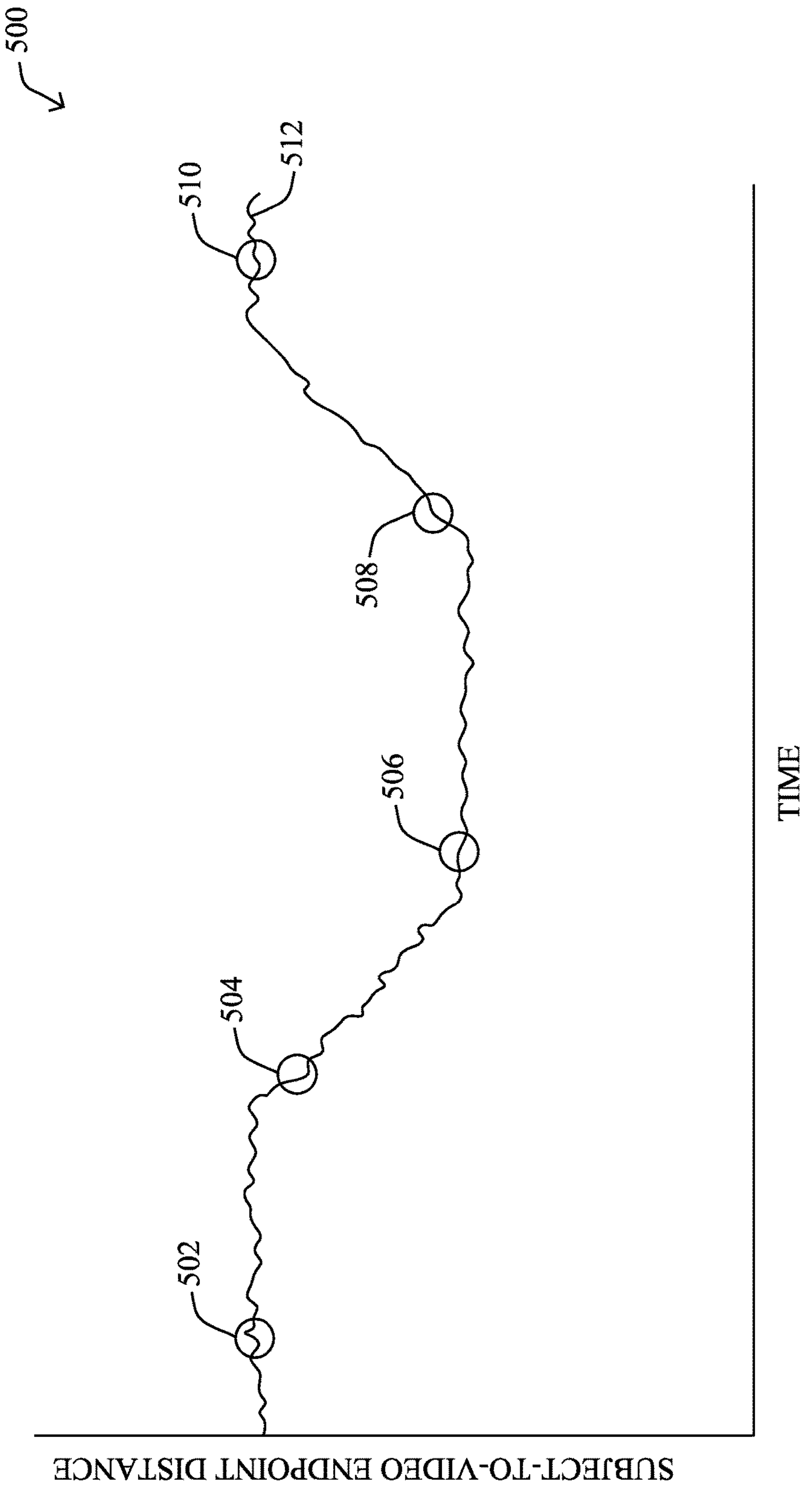
FIG. 5 illustrates an example of an output of an audio ping echo-based distance measurement for echo-based focusing.

FIG. 5 illustrates an example of an output 500 of an audio ping echo-based distance measurement for echo-based focusing, according to various embodiments. The line chart 512 of output 500 corresponds to an audio ping echo distance measurement of subject-to-video conferencing endpoint distance (e.g., vertical axis) over time (e.g., horizontal axis). For instance, the line chart 512 may correspond to subject-to-video conferencing endpoint distance measurements occurring over time as the subject moves closer to a camera (e.g., reducing subject-to-video conferencing endpoint distance) and then further away from a camera (e.g., increasing subject-to-video conferencing endpoint distance).

At first point 502, line chart 512 reflects a subject's first position and/or distance from the video endpoint. First point 502 may correspond to a period when a camera is configured with an initial focus point that causes a focused image capture of the subject at the first position and/or distance from the video endpoint. At first point 502, line chart 512 may be relatively stable. That is, while the subject-to-video endpoint distance measurements are fluctuating slightly they are generally stable enough to maintain a focused image using the initial focus point.

Line chart 512 and/or the constituent subject-to-video conferencing endpoint distance measurements may be determined to be stabilized so long as their fluctuations remain above or below a threshold distance, remain within a threshold range of distances, are changing at less than a threshold among of change, are changing at less than a threshold rate of change, correspond to a trendline having a slope that does not exceed a slope threshold, etc. In various embodiments, line chart 512 may be stabilized when it remains relatively flat and fluctuates within a range of distances that correspond to the upper and/or lower limits of distance capable of being maintained in focus at the current focus position.

At second point 504, line chart 512 reflects a subject's second position and/or distance from the video endpoint. At second point 504, the subject's position and/or distance from the video endpoint and, as a result, line chart 512 may be changing. For example, at second point 504 the subject may be approaching the camera thereby decreasing the subject-to-video conferencing endpoint distance (e.g., leaning towards the camera). Second point 504 may correspond to a point where it is determined that the subject-to-video endpoint distance is no longer stable and is in the process of changing.

In some examples, the determination that the subject-to-video conferencing endpoint distance is in the process of changing may be based on line chart 512 and/or the constituent subject-to-video conferencing endpoint distance measurements fluctuating such that they no longer remain above or below a threshold distance, no longer remain within a threshold range of distances, are no longer changing at less than a threshold among of change, are no longer changing at less than a threshold rate of change, no longer correspond to a trendline having a slope that does not exceed a slope threshold, etc. In various embodiments, line chart 512 may be determined to be changing when it is rapidly changing in a specific and consistent direction and/or has exceeded a range of distances that correspond to the upper and/or lower limits of distances capable of being maintained in a acceptable focus at the current focus position. Once it is determined that the subject-to-video endpoint distance is in the process of changing and/or changing in a direction nearer to the camera, a determination may be made whether to immediately initiate a refocusing operation to move a focus of the camera towards the macro or to delay a refocusing operation until the subject-to-video endpoint distance has stabilized.

At third point 506, line chart 512 reflects a subject's third position and/or distance from the video endpoint. At third point 506, line chart 512 may have stabilized following the change detected at second point 504. That is, while the subject-to-video endpoint distance measurements are fluctuating slightly they are generally stabilized enough to maintain a focused image using a single focus point and/or small range of updated focus points.

Again, line chart 512 and/or the constituent subject-to-video conferencing endpoint distance measurements may be determined to be stabilized so long as their fluctuations remain above or below a threshold distance, remain within a threshold range of distances, are changing at less than a threshold among of change, are changing at less than a threshold rate of change, correspond to a trendline having a slope that does not exceed a slope threshold, etc. In various embodiments, line chart 512 may be stabilized when it remains relatively flat and fluctuates within a range of distances that correspond to the upper and/or lower limits of distance capable of being maintained in focus at an updated focus position.

In various embodiments where the refocusing operation was delayed during the change in the subject-to-video conferencing endpoint distance until stabilization, the refocusing operation may then be initiated at third point 506. The direction and/or other parameters of the focus search may be configured based on the previous subject-to-video conferencing endpoint distance measurements, as described above. With a perfectly calibrated focus mechanism with known mapping from focus position to focusing distance to subject, the focus may be moved directly and/or track the subjects movement. However, this mapping may not initially exist for the video endpoint.

Nevertheless, the prior subject-to-video endpoint distance measurements may instruct a determination of the direction of focus movement to achieve focus correction. Further, an amount of focus steps in a focus search that should bring the subject back into focus may be determined. This determination may be based on the change in distance measurements from the distance measurement at the initial focus point to the distance measurement once stabilized. Additionally, or alternatively, a known distance change-to-step relationship may be used to determine the amount of focus steps. These determinations may be utilized to configure and execute the focus search of the refocusing operation.

After each successful focus search (e.g., a peak focal point is determined for a subject-to-video conferencing endpoint distance measurement) the subject-to-video conferencing endpoint distance measurements from the audio ping echo delay measurement may be stored together with the peak focal position resolved in that search. As a result, a lookup database may be created that may be referenced for future subject-to-video endpoint distance measurements.

For example, when a subject moves to a particular subject-to-video endpoint distance where the camera has already achieved a successful peak focal position, the stored peak focal position for that particular subject-to-video endpoint distance may be retrieved from the lookup database and used to steer the refocusing operation. A quick verification focus search may be performed each time a stored focal position is used in order to verify that it still represents a peak focal position at that subject-to-video conferencing endpoint distance in current image captures.

At fourth point 508, line chart 512 reflects a subject's fourth position and/or distance from the video endpoint. At fourth point 508, the subject's position and/or distance from the video endpoint and, as a result, line chart 512 may be changing. For example, at fourth point 508 the subject may be receding away from the camera thereby increasing the subject-to-video conferencing endpoint distance (e.g., leaning away from the camera). Fourth point 508 may correspond to a point where it is determined that the subject-to-video conferencing endpoint distance is no longer stable and is once again in the process of changing.

In some examples, the determination that the subject-to-video conferencing endpoint distance is in the process of changing may be based on line chart 512 and/or the constituent subject-to-video conferencing endpoint distance measurements fluctuating such that they no longer remain above or below a threshold distance, no longer remain within a threshold range of distances, are no longer changing at less than a threshold among of change, are no longer changing at less than a threshold rate of change, no longer correspond to a trendline having a slope that does not exceed a slope threshold, etc. In various embodiments, line chart 512 may be determined to be changing when it is rapidly changing in a specific and consistent direction and has exceeded a range of distances that correspond to the upper and/or lower limits of distance capable of being maintained in focus at the current focus position. Once it is determined that the subject-to-video endpoint distance is in the process of changing and/or changing in a direction further from the camera, a determination may be made whether to immediately initiate a refocusing operation to move a focus of the camera towards the infinity or to delay a refocusing operation until the subject-to-video endpoint distance has once again stabilized.

At fifth point 510, line chart 512 reflects a subject's fifth position and/or distance from the video endpoint. At fifth point 510, line chart 512 may have once again stabilized following the change detected at fourth point 508. That is, while the subject-to-video endpoint distance measurements are fluctuating slightly they are generally stabilized enough to maintain a focused image using a new updated focus point(s).

Again, line chart 512 and/or the constituent subject-to-video conferencing endpoint distance measurements may be determined as stabilized so long as their fluctuations remain above or below a threshold distance, remain within a threshold range of distances, are changing at less than a threshold among of change, are changing at less than a threshold rate of change, correspond to a trendline having a slope that does not exceed a slope threshold, etc. In various embodiments, line chart 512 may be stabilized when it remains relatively flat and fluctuates within a range of distances that correspond to the upper and/or lower limits of a distance capable of being maintained in focus at a new updated focus position.

In various embodiments where the refocusing operation was delayed during the change in the subject-to-video conferencing endpoint distance until stabilization, the refocusing operation may then be initiated at fifth point 510. The direction and/or other parameters of the focus search may be configured based on the previous subject-to-video conferencing endpoint distance measurements as described above.

As previously mentioned, stored relationships between prior subject-to-video endpoint distance measurements and focus points may be used to direct the focus search. As can be seen in output 500, fifth point 510 is at a same and/or very similar subject-to-video conferencing endpoint distance as was first point 502. Therefore, the stored focus point associated with the first point may be reused and the camera may be instructed to move to and start its focus search directly at and/or proximate to that stored focus point. Once at the stored focus point, an abridged focus search may be performed to verify that the focus is locked at the best position for the current image capture.

Figure 6:
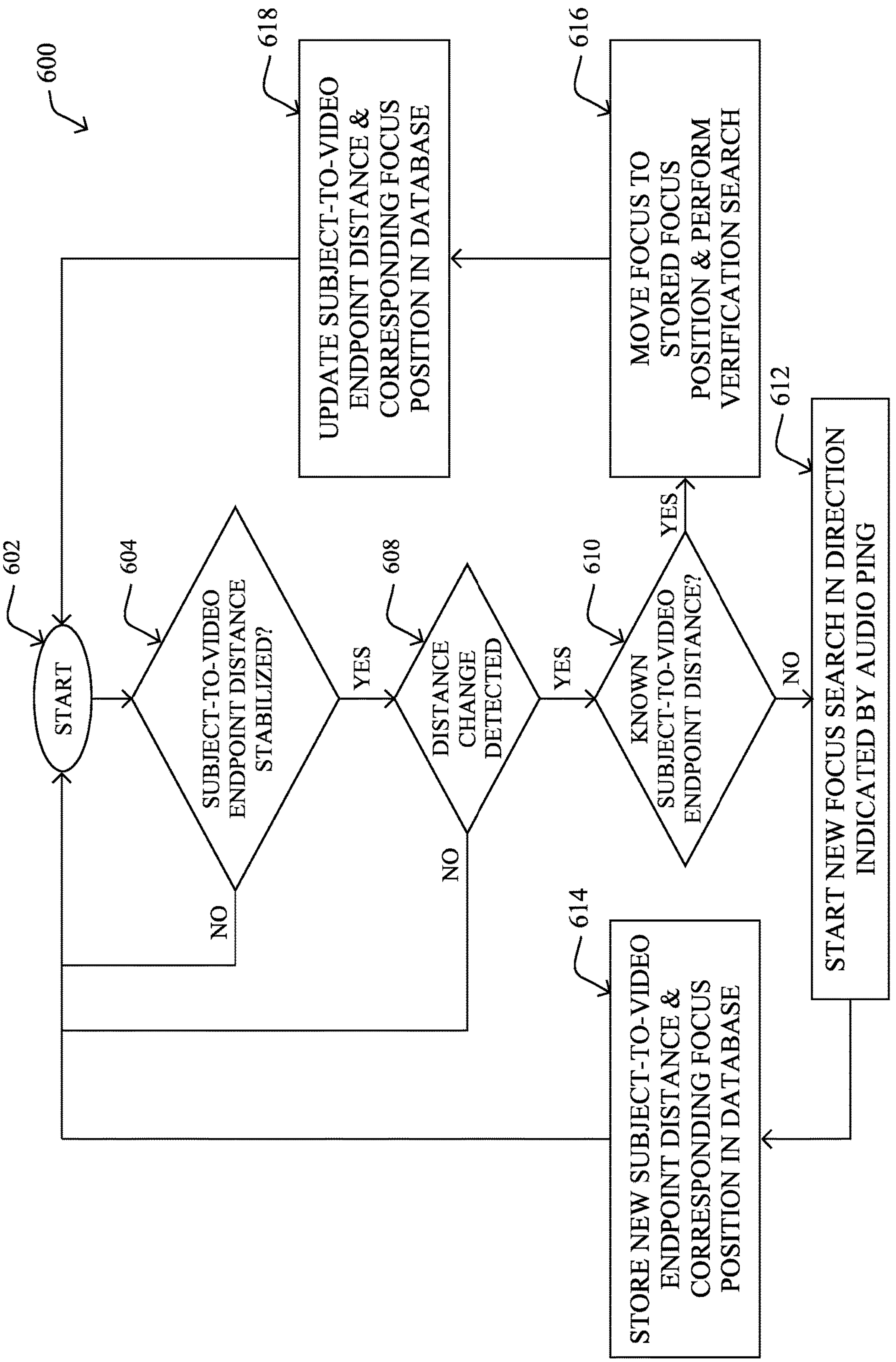
FIG. 6 illustrates an example of a process flow for echo-based focusing.

FIG. 6 illustrates an example of a process flow 600 for echo-based focusing, according to various embodiments. Specifically, flow 600 illustrates an example of steering logic for configuring each-based refocusing operations at a camera of a video conferencing endpoint.

Flow 600 may begin at box 602. In various embodiments, box 602 may correspond to a portion of a video conferencing session. For example, at box 602 a subject of an image capture for a video conferencing session may be detected by a camera of a video conferencing endpoint. At box 602, the camera may be focused to a first focus position. The first focus position may be a position corresponding to a peak focus position for focusing on the subject. The first focus position may be a result of a prior auto focus search by the camera.

In various embodiments, at box 602 the subject of the image capture may be moving. Specifically, the subject may be moving in a manner that is changing their distance from a front lens of the camera. The changing subject-to-video conferencing endpoint distance measurements may be detected (e.g., using audio ping echo delay) and, at box 602, focusing operations may be postponed during the change. Therefore, the camera may be using a historical peak focus position from a successful focus search conducted prior to the beginning of the change. The historical peak focus position may or may not be a peak focus position for the subject during the change.

At box 604, a determination may be made whether the subject-to-video conferencing endpoint distance has stabilized. If the determination is made that the subject-to-video conferencing endpoint distance has not yet stabilized, then it may be assumed that the subject-to-video conferencing endpoint distance is still changing and the flow 600 may return to box 602. Conversely, if the determination is made that the subject-to-video conferencing endpoint distance has stabilized following the change, then the flow 600 may proceed to box 608.

At box 608, a determination may be made whether a distance change is detected. Specifically, this may be a determination as to whether the subject-to-video conferencing endpoint distance has changed from a prior subject-to-video conferencing endpoint distance (e.g., measured when the subject-to-video conferencing endpoint distance was stabilized prior to the change, measured at some point during the change, etc.).

The determination may be whether the most recently measured subject-to-video conferencing endpoint distance has changed more than a threshold amount from the prior subject-to-video conferencing endpoint distance. In various embodiments, the determination may be made whether the subject-to-video conferencing endpoint distance change exceeds a maximum distance change beyond which the focus position from the prior subject-to-video conferencing endpoint distance can provide an acceptable focused image of the subject (e.g., the distance has changed enough that the former focus point won't work for the new subject-to-video endpoint distance).

If at box 608 it is determined that there has been no change and/or a change of an insufficient magnitude to warrant a refocusing operation, then flow 600 may proceed back to box 602. Conversely, if at box 608 it is determined that there has been a change and/or a change of a sufficient magnitude to warrant a refocusing operation then flow 600 may proceed to box 610.

At box 610, a determination may be made whether the subject-to-video conferencing endpoint distance is a "known" subject-to-video conferencing endpoint distance. For example, a most recently measured subject-to-video conferencing endpoint distance following the change may be referenced against a mapping of historical subject-to-video conferencing endpoint distance measurements and the peak focal position resolved for those distances by their historical focus searches.

If it is determined at box 610 that the most recently measured subject-to-video conferencing endpoint distance does not match or approximate a historical subject-to-video conferencing endpoint distance measurement stored in the mapping and/or that the most recently measured subject-to-video conferencing endpoint distance is being encountered for the first time, the flow 600 may proceed to box 612. At box 614, a new focus search may be started. The search may be initiated in a focal direction (e.g., near, far, etc.) that is indicated by the audio ping echo delay measurements. More specifically, the search may be initiated in a direction in which the subject has moved from a previous focus search to its most recent position as determined by the subject-to-video conferencing endpoint distance change direction from the starting subject-to-video conferencing endpoint distance of the previous focus search to its most recent stabilized subject-to-video conferencing endpoint distance.

That is, if the most recently measured subject-to-video conferencing endpoint distance after the change is closer to the camera than the stabilized subject-to-video conferencing endpoint distance before the change, then the focus search may be configured to proceed from its current position near toward the camera and/or its hyperfocal point. Conversely, if the most recently measured subject-to-video conferencing endpoint distance after the change is further from the camera than the stabilized subject-to-video conferencing endpoint distance before the change, then the focus search may be configured to proceed from its current position away from the camera and toward infinity.

Once the new focus search has resolved a new focus position for the most recently measured subject-to-video conferencing endpoint distance, flow 600 may proceed to box 614. At box 614, that most recently measured subject-to-video conferencing endpoint distance and the corresponding focus position resolved by the new focus search for that most recently measured subject-to-video conferencing endpoint distance may be stored in a database. These corresponding values may be added as a corresponding pair to a mapping of subject-to-video conferencing endpoint distances to their corresponding focus positions. Then flow 600 may return to box 602 to await further input.

Conversely, if it were determined at box 610 that the most recently measured subject-to-video conferencing endpoint distance does match or approximate a historical subject-to-video conferencing endpoint distance measurement stored in the mapping, the flow 600 may proceed to box 616. At box 616, unlike the search initiated at box 612, the camera may be configured to move its focus directly to a stored focus position. For example, the camera may be instructed to move its focus position directly to the stored focus position corresponding to the matching historical subject-to-video conferencing endpoint distance measurement stored in the mapping.

In addition, a verification focus search may be initiated at box 616. The verification focus search may include a truncated focus search that starts at and/or verifies the stored focus position used to focus the camera for box 616. The verification search may confirm that the stored focus position is the peak focus position in the present image capture.

The flow 600 may then proceed to box 618. At box 618, the subject-to-video conferencing endpoint distance and/or its corresponding focus position may be updated in the database. For example, if the verification search at box 616 resolves a better focus position than the stored focus position used to initially focus the camera at box 616, then the mapping may be updated so that the subject-to-video conferencing endpoint distance now corresponds to the newly resolved better focus position in the mapping. That is, the existing focus position stored in correspondence to the subject-to-video conferencing endpoint distance in the mapping may be replaced with the newly resolved focus position. After updating the database and/or determining that no update is necessary (e.g., historical focus position is verified as best focus position for subject-to-video conferencing endpoint distance in image capture being searched), the flow 600 may return to box 602 to await further input.

Therefore, in flow 600, with only an audio ping echo delay distance measurement and no prior history of focus positions at that distance, a new refocusing search may be initiated to collect this data. The database with the subject-to-video conferencing endpoint distance and matching focus position may be conceptualized as a continuous running calibration for each module, where over time more data is collected for each system and better focusing decisions are possible as a result.

The audio ping echo delay measurements may provide the information about when it is necessary to start a new focus search and in which direction the focus position of a camera should be moved for that search. In various embodiments, existing video conferencing endpoints may receive a software upgrade to implement these echo-based refocusing techniques using their existing internal microphones, loudspeakers, cameras, etc. and/or without adding any specialized hardware. In such examples, the existing loudspeaker may be used to generate ultrasonic signals up to 24 kHz whose echo is then detected by the internal microphones.

Figure 7:
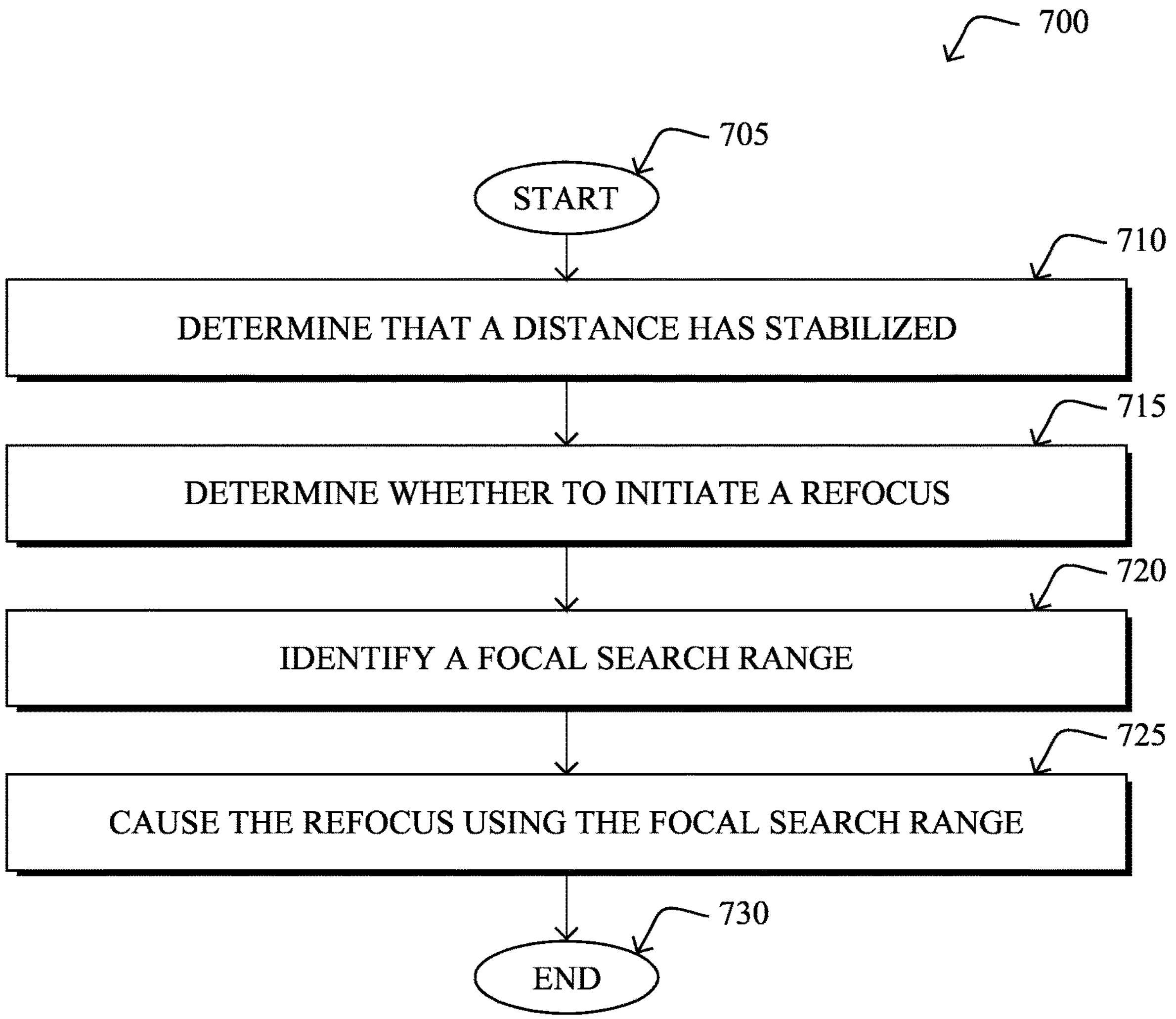
FIG. 7 illustrates an example simplified procedure for echo-based focusing.

FIG. 7 illustrates an example simplified procedure (e.g., a method) for echo-based focusing, in accordance with one or more embodiments described herein. For example, a non-generic, specifically configured device (e.g., device 200), may perform procedure 700 by executing stored instructions (e.g., focus process 248). The procedure 700 may start at step 705, and continues to step 710, where, as described in greater detail above, a device may make, based on an echo reflected from a subject of an image capture, a determination that a distance between a camera and the subject of the image capture has stabilized following a change in the distance. The echo may be a portion of an ultrasonic audio signal reflected off the subject and received at a microphone. Therefore, making the determination may include computing a delay between when the microphone receives the portion of the ultrasonic audio signal reflected off the subject and when the ultrasonic audio signal was sent.

At step 715, as detailed above, the device may determine whether to initiate a refocus of the camera on the subject based on the distance between the camera and the subject of the image capture following the change. For example, if the distance between the camera and the subject has changes more than a threshold amount since a prior successful focusing operation, it may be determined that a refocusing operation is likely required to bring the subject back into focus.

At step 720, as detailed above, a device may identify a focal search range of the refocus based on the distance between the camera and the subject of the image capture following the change. The focal search range may be one or more focus positions to be used for a focus search by the camera.

For example, the device may identify the focal search range of the refocus comprises identifying a stored focus position resulting from a prior refocus operation based on the distance between the camera and the subject of the image capture following the change in the distance. The device may determine, following the refocus on the subject, whether the stored focus position is a focus peak and modify the stored focus position and the distance between the camera and the subject of the image capture following the change in the distance, in response to determining that the stored focus position is not the focus peak. Likewise, the device may store a focus position resulting from the refocus on the subject and the distance between the camera and the subject of the image capture following the change in the distance.

In various embodiments, the focal search range may be a direction (e.g., proceeding toward the camera (near), proceeding toward infinity (far), etc.) in which a focus search should proceed. For example, the device may obtain, based on the echo reflected from the subject of the image capture, an indication of a direction of the change in the distance. The device may identify the focal search range of the refocus based on the direction of the change in the distance.

In some examples, the device may determine a magnitude of the change in the distance. In such examples, identifying the focal search range of the refocus may include identifying an amount of focus steps to be applied in the refocus based on the magnitude of the change in the distance. The amount of focus steps may be used to identify the focal search range to be used by the camera.

At step 725, where, as detailed above, a device may cause the refocus on the subject using the focal search range. Causing the refocus on the subject may include performing an auto focus search for an optimal focus on the subject within and/or proximate to the identified focal search range.

Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, use audio ping echo delay distance measurements to deliver robust and fast auto focus functionality using existing video conferencing equipment. These techniques may reduce the frequency and duration of auto focusing operations to minimize and/or eliminate irritating autofocusing artefacts. Further, by enabling faster and more accurate decisions about when and in which direction an auto focusing operation should be undertaken, ineffective focusing searches re avoided thereby conserving time and computational resources. As a result, the performance of video conferencing applications and/or their underlying networks may be improved by these techniques While there have been shown and described illustrative embodiments that provide echo-based focusing, it is to be understood that various other adaptations and modifications may be made within the spirit and scope of the embodiments herein. For example, while certain embodiments are described herein with respect to using the techniques herein for certain purposes, the techniques herein may be applicable to any number of other use cases, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

making, by a device and based on an echo comprising a portion of an ultrasonic audio signal reflected from a subject of an image capture, a determination that a distance between a camera and the subject of the image capture has stabilized following a change in the distance, wherein the echo is of sound emission of the device;

determining, by the device, whether to initiate a refocus of the camera on the subject based on the distance between the camera and the subject of the image capture following the change;

identifying, by the device and based on the distance between the camera and the subject of the image capture following the change, a focal search range for configuring a focus search operation of the refocus; and causing, by the device, the refocus on the subject using the focal search range.

2. The method as in claim 1, wherein the ultrasonic audio signal is emitted by a speaker of the device configured output audio of a video conferencing session, and wherein the echo is received at a microphone of the device configured to capture audio of the video conferencing session.

3. The method as in claim 2, wherein making the determination further comprises:

computing a delay between when the microphone receives the portion of the ultrasonic audio signal reflected off the subject and when the ultrasonic audio signal was sent.

4. The method as in claim 1, further comprising:

obtaining, based on the echo reflected from the subject of the image capture, an indication of a direction of the change in the distance.

5. The method as in claim 4, further comprising:

identifying the focal search range of the refocus based on the direction of the change in the distance.

6. The method as in claim 1, further comprising:

storing a focus position resulting from the refocus on the subject and the distance between the camera and the subject of the image capture following the change in the distance.

7. The method as in claim 1, wherein identifying the focal search range of the refocus comprises identifying a stored focus position resulting from a prior refocus operation based on the distance between the camera and the subject of the image capture following the change in the distance.

8. The method as in claim 7, further comprising:

determining, following the refocus on the subject, whether the stored focus position is a focus peak; and modifying the stored focus position and the distance between the camera and the subject of the image capture following the change in the distance, in response to determining that the stored focus position is not the focus peak.

9. The method as in claim 1, further comprising:

determining a magnitude of the change in the distance.

10. The method as in claim 9, wherein identifying the focal search range of the refocus comprises:

identifying an amount of focus steps to be applied in the refocus based on the magnitude of the change in the distance.

11. An apparatus, comprising:

one or more network interfaces;

a processor coupled to the one or more network interfaces and configured to execute one or more processes; and a memory configured to store a process that is executable by the processor, the process when executed configured to:

make, based on an echo comprising a portion of an ultrasonic audio signal reflected from a subject of an image capture, a determination that a distance between a camera and the subject of the image capture has stabilized following a change in the distance, wherein the echo is of sound emission of the apparatus;

determine whether to initiate a refocus of the camera on the subject based on the distance between the camera and the subject of the image capture following the change;

identify, based on the distance between the camera and the subject of the image capture following the change, a focal search range for configuring a focus search operation of the refocus; and cause the refocus on the subject using the focal search range.

12. The apparatus as in claim 11, wherein the ultrasonic audio signal is emitted by a speaker of the device configured output audio of a video conferencing session, and wherein the echo is received at a microphone of the device configured to capture audio of the video conferencing session.

13. The apparatus as in claim 12, wherein the process when executed is further configured to make the determination by computing a delay between when the microphone receives the portion of the ultrasonic audio signal reflected off the subject and when the ultrasonic audio signal was sent.

14. The apparatus as in claim 11, wherein the process when executed is further configured to:

obtain, based on the echo reflected from the subject of the image capture, an indication of a direction of the change in the distance.

15. The apparatus as in claim 14, wherein the process when executed is further configured to:

identify the focal search range of the refocus based on the direction of the change in the distance.

16. The apparatus as in claim 11, wherein the process when executed is further configured to:

store a focus position resulting from the refocus on the subject and the distance between the camera and the subject of the image capture following the change in the distance.

17. The apparatus as in claim 11, wherein the process when executed is further configured to:

identify the focal search range of the refocus by identifying a stored focus position resulting from a prior refocus operation based on the distance between the camera and the subject of the image capture following the change in the distance.

18. The apparatus as in claim 17, wherein the process when executed is further configured to:

determine, following the refocus on the subject, whether the stored focus position is a focus peak; and modify the stored focus position and the distance between the camera and the subject of the image capture following the change in the distance, in response to determining that the stored focus position is not the focus peak.

19. The apparatus as in claim 11, wherein the process when executed is further configured to:

determine a magnitude of the change in the distance; and identify the focal search range of the refocus by identifying an amount of focus steps to be applied in the refocus based on the magnitude of the change in the distance.

20. A tangible, non-transitory, computer-readable medium storing program instructions that cause a device to execute a process comprising:

making, by the device and based on an echo comprising a portion of an ultrasonic audio signal reflected from a subject of an image capture, a determination that a distance between a camera and the subject of the image capture has stabilized following a change in the distance, wherein the echo is of sound emission of the device;

determining, by the device, whether to initiate a refocus of the camera on the subject based on the distance between the camera and the subject of the image capture following the change;

identifying, by the device and based on the distance between the camera and the subject of the image capture following the change, a focal search range for configuring a focus search operation of the refocus; and causing, by the device, the refocus on the subject using the focal search range.

* * * * *